(12) United States Patent
Devenyi (10) Patent No.: US 6,795,598 B1
(45) Date of Patent: Sep. 21, 2004

(54) LIQUID-LEVEL SENSOR HAVING MULTIPLE SOLID OPTICAL CONDUCTORS WITH SURFACE DISCONTINUITIES

(75) Inventor: Gabor Devenyi, Penetang (CA)

(73) Assignee: Raytheon Company, Waltham, MA (US)

( * ) Notice: Subject to any disclaimer, the term of this patent is extended or adjusted under 35 U.S.C. 154(b) by 193 days.

(21) Appl. No.: 10/084,707

(22) Filed: Feb. 26, 2002

(51) Int. Cl.[7] .............................................. G02B 6/00
(52) U.S. Cl. ............................ 385/12; 385/15; 385/31; 385/39; 250/577
(58) Field of Search ........................... 395/12, 15, 31, 395/39; 250/577

(56) References Cited

U.S. PATENT DOCUMENTS

| | | | |
|---|---|---|---|
| 2,909,857 A | | 10/1959 | Wilson |
| 3,120,125 A | * | 2/1964 | Vasel ........................... 73/293 |
| 3,192,392 A | | 6/1965 | Reed |
| 3,526,880 A | | 9/1970 | Filippazzi |
| 3,683,196 A | | 8/1972 | Obenhaus |
| 3,713,338 A | * | 1/1973 | Kind ............................ 73/293 |
| 3,995,169 A | | 11/1976 | Oddon |
| 4,119,860 A | * | 10/1978 | Gooley ........................ 250/577 |
| 4,187,025 A | | 2/1980 | Harmer |
| 4,860,551 A | | 8/1989 | Query |
| 4,994,682 A | * | 2/1991 | Woodside .................... 250/577 |
| 5,164,608 A | * | 11/1992 | Vali et al. ................... 250/577 |
| 5,235,179 A | * | 8/1993 | Chang et al. ........... 250/227.21 |
| 5,384,871 A | | 1/1995 | Devenyi |

* cited by examiner

Primary Examiner—Akm Enayet Ullah
Assistant Examiner—Sung Pak
(74) Attorney, Agent, or Firm—William C. Schubert

(57) ABSTRACT

A liquid-level sensor is used to sense th level of a liquid. The sensor has at least two solid optical conductors, wherein each solid optical conductor includes an outer surface having at least one reflective surface discontinuity of sufficient size to interfere with a total internal reflection of the solid optical conductor when the reflective surface discontinuity does not contact the liquid. A support positions the reflective surface discontinuities at a different height above the boom of the volume. A light source introduces light into a first end of each of the solid optical conductors. A light detector structure receives light that has been introduced into each of the solid optical conductors and has traveled through the respective solid optical conductor at least as far as at least one of the reflective surface discontinuities of the respective solid optical conductor.

20 Claims, 5 Drawing Sheets

LIQUID-LEVEL SENSOR HAVING MULTIPLE SOLID OPTICAL CONDUCTORS WITH SURFACE DISCONTINUITIES

This invention relates to a liquid-level sensor and, more particularly, to the liquid-level sensor using optical fibers with surface discontinuities to indicate the presence of a liquid contacting each of the optical fibers.

BACKGROUND OF THE INVENTION

Several techniques exist for measuring the level of a liquid. In the simplest, a mechanical dipstick provides a measure of the depth of the liquid relative to a fixed reference point, such as the bottom of a container. A mechanical float that rides on the surface of the liquid may be used to measure the liquid level relative to a float attachment point. The dipstick cannot be used for most remote sensing applications. The mechanical float is complex in practice and prone to failure in some applications.

Electrical techniques for measuring the liquid level are also available. In one widely used approach, a capacitor is formed by two facing metal plates and the liquid between them. As the liquid level varies, the capacitance changes. The relation between liquid level and capacitance may be calibrated, so that subsequent capacitance measurements may be related to liquid level. The capacitance technique has the virtues that there are no mechanical movements and there is an electrical readout that is suited for remote sensing applications. However, it requires relatively large components in the liquid container and also requires the application of a voltage across the plates and thence across the liquid. The latter requirement is associated with substantial power consumption and also may be unacceptable where the liquid is flammable.

Optical techniques are also known. In one, a light beam is directed from a source vertically through the container to a detector. The reduction in measured intensity of the light beam is a measure of the amount of liquid between the source and the detector, and thence the liquid level. This approach has an electrical output signal and no electrical potential is applied through the liquid. However, this method is limited as to the depth of liquid that may be measured due to the attenuation of the light in the liquid, and is also sensitive to influences such as vapor above the liquid, currents within the liquid, bubbles in the liquid, misalignment of the source and the detector, and the like.

Other optical techniques require that a relatively large-diameter optical conductor be immersed into the liquid, or that some portion of the instrumentation be immersed into the liquid or that the optical conductor be of sufficiently large size to carry the instrumentation. In other approaches, the light source and/or the light detector must be very precisely positioned relative to the optical conductor. These approaches all utilize electrical sensing instrumentation.

Although there are numerous techniques for measuring liquid level and other properties, there is a need for an improved approach which overcomes the difficulties discussed above with the existing approaches. The present invention fulfills this need, and further provides related advantages.

SUMMARY OF THE INVENTION

The present invention provides an apparatus and method for measuring the level of a liquid. The approach is based upon optical principles, and may be implemented entirely without the use of electrical sensing instrumentation (or, alternatively, electrical sensing instrumentation may be used). The approach is not sensitive to the presence of bubbles, fluid flows, or other interference from the liquid whose level is measured. Additionally, the system has no moving parts, is simple in structure and highly reliable, is of low cost and low weight, and has a low power consumption.

In accordance with the invention, a liquid-level sensor is operable with a volume in which a liquid may be present to different heights above a bottom of the volume. The liquid may be in a container or not in a container. The sensor comprises at least two solid optical conductors, preferably optical fibers. Each solid optical conductor includes an outer surface having at least one reflective surface discontinuity of sufficient size to interfere with a total internal reflection of the solid optical conductor when the reflective surface discontinuity does not contact the liquid. A support positions the reflective surface discontinuity of each of the at least two solid optical conductors at a location corresponding to a different height above the bottom of the volume. A light source introduces light into a first end of each of the solid optical conductors. A light detector structure receives light that has been introduced into each of the solid optical conductors and has traveled through the respective solid optical conductor at least as far as at least one of the reflective surface discontinuities of the respective solid optical conductor.

Most preferably, the light detector structure comprises a non-electrical structure. In one embodiment, the light detector structure comprises a light diffuser having a visual indication thereon of the liquid level. The light detector structure may instead be an electrical detector device.

In a most preferred embodiment, the light detector structure comprises a non-electrical light diffuser in the form of a light display. The light diffuser and display are positioned so that a second end of each of the solid optical conductors directs a respective output beam onto a respective region of the light diffuser. Each of the respective regions has a visual indication thereon of being illuminated by its respective output beam. Such visual indications may be, for example, a color of the illuminated region, alphanumeric characters on the illuminated region, and the like. The liquid level is indicated by the highest-value region that is illuminated.

The light detector structure is preferably positioned at a second end of each of the solid optical conductors. The light detector structure may instead be positioned at the first end of the solid optical conductor (the same end as the light source), and a second end of the solid optical conductor is made to be reflective of light.

The reflective surface discontinuity may be a transverse surface notch. It may instead be another type of non internally reflective portion of the outer surface of each of the solid optical conductor. An example is a non internally reflective flat or a sufficiently high-relief surface roughening on the outer surface of the solid optical conductors.

The present approach provides for liquid-level sensing using a number of optical conductors immersed into the liquid. The more optical conductors, the greater the resolution of the liquid level. In the preferred light-detector structure using a non-electrical, diffuser display, no electrical sensing device is utilized. The reliability of the system is thereby increased, although the distance between the liquid being sensed and the light-detector structure is limited. In many applications, however, there is no need for translating the liquid-level measurement into an electrical signal that may be transmitted over long distances. An example is the fuel level of an automobile. The fuel tank is typically located no more than about 15 feet or so from the driver's instrumentation panel, which is well within the distance suitable for using the non-electrical sensing approach of the present invention. There is no electrical wiring at the point of the display, and there is no electromagnetic radiation at the display site. In other instances, both electrical and non-electrical sensing may be used together.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment

DETAILED DESCRIPTION OF THE INVENTION

Figures 1, 2:
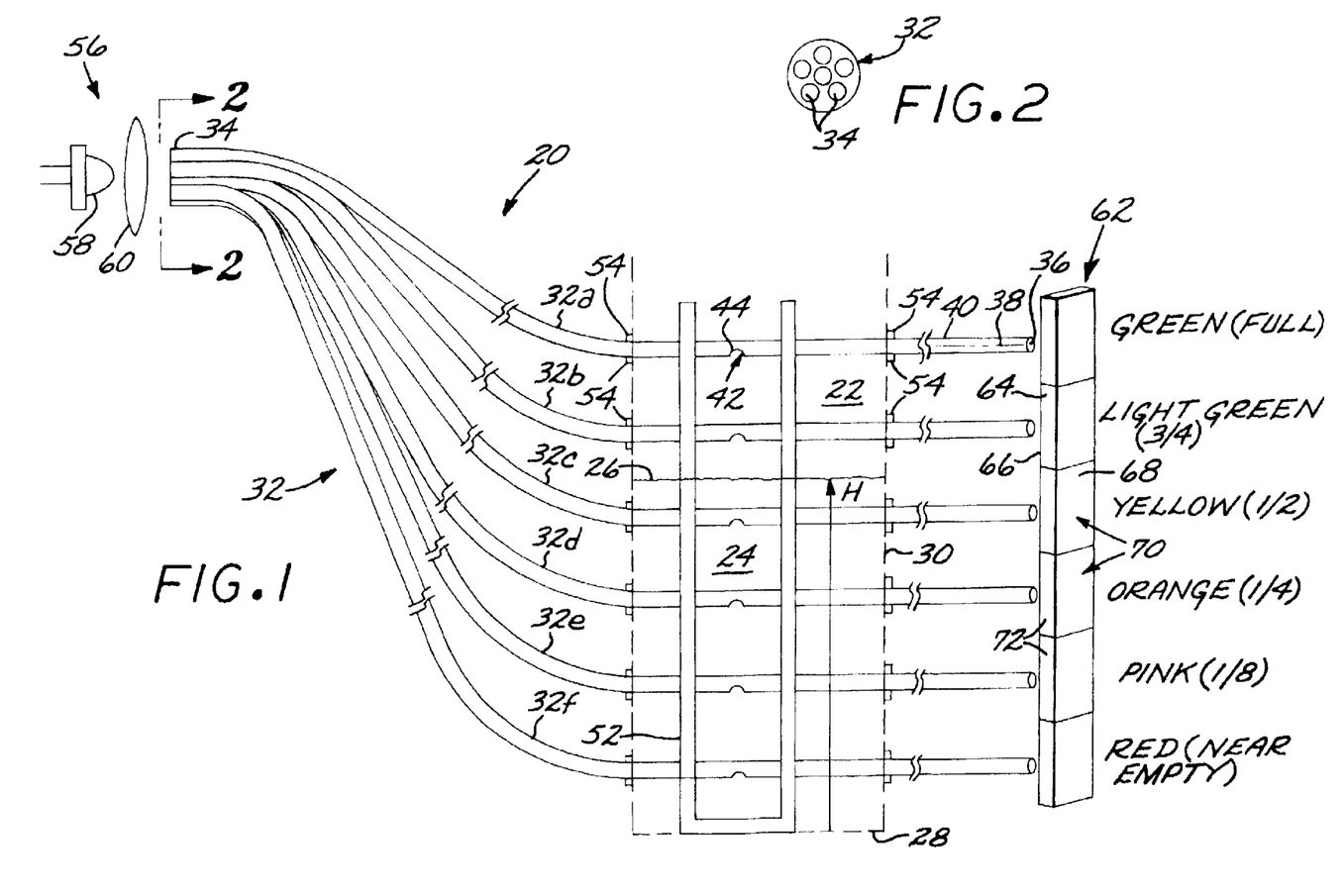
FIG. 1 is a schematic view of a liquid-level sensor.
FIG. 2 is a sectional view of the liquid-level sensor, taken on line 2—2 of FIG. 1.

FIG. 1 depicts a liquid-level sensor 20 operable with a volume 22 in which a liquid 24, having a liquid surface 26, may be present to different heights H above a bottom 28 of the volume 22. In FIG. 1, the liquid 24 and the volume 22 are within a container 30, but that need not be the case. For example, the liquid 24 could be in a lake or a stream and thus not within a well-defined container. Where the container 30 is present, the container 30 may be a static container or a flowing container such as a pipe through which the liquid 24 flows.

The liquid-level sensor 20 comprises at least two solid optical conductors 32. In the illustration, there are six optical conductors 32, respectively designated as solid optical conductors 32a–32f. Each solid optical conductor 32 has a first end 34, a second end 36, and an axis of elongation 38 extending between the first end 34 and the second end 36. Light propagates along the length of the solid optical conductor 32 by total internal reflection, except as discussed subsequently, from an outer surface 40 of the solid optical conductor 32. The solid optical conductor 28 is preferably the core of an optical fiber, with an optional cladding (not shown) as is often used to protect the core of optical fibers. In the case where the solid optical conductor 32 is an optical fiber, the axis of elongation 38 follows the center of the optical fiber, and consequently may be bent and curved, as illustrated in FIG. 1.

The solid optical conductor 32 is made of a material of construction that is transparent to the wavelengths of light to be transmitted and has an index of refraction greater than that of the liquid 24 to be sensed. Optical glass is preferred for use with light in the visible spectrum, but an optical-grade plastic may be used. Appropriate materials are selected for other portions of the spectrum, such as the infrared, that may be employed. The light passing through the solid optical conductor 32 travels generally parallel to the axis of elongation 38, taking into account the total internal reflection of the light.

The outer surface 40 of each of the solid optical conductors 32 has at least one reflective surface discontinuity 42 of sufficient size to interfere with a total internal reflection of the solid optical conductor 32 when the reflective surface discontinuity 42 does not contact the liquid 24. The reflective surface discontinuity 42 may be of any operable type. Four types of reflective surface discontinuities 42 are discussed herein, the first being a transverse surface notch 44 shown in FIG. 1. A transverse surface notch 44 is a local reduction in thickness of the solid optical conductor 32 having a length component extending perpendicular to the axis of elongation 38 of the solid optical conductor 32 and thence to the direction of light propagation. Each transverse surface notch 44 is of sufficient size to interfere with the total internal reflection of the solid optical conductor 32 when the transverse surface notch 44 does not contact the liquid 24. (As used herein, "interfere" means to hinder, act as an obstacle, or impede. It is not used to mean a diffraction interference between two waves.) The surface notch 44 preferably does not extend all of the way around the periphery of the solid optical conductor 32, but instead extends less than about 45 degrees around the periphery and most preferably less than about 20 degrees around the periphery.

Figure 3:
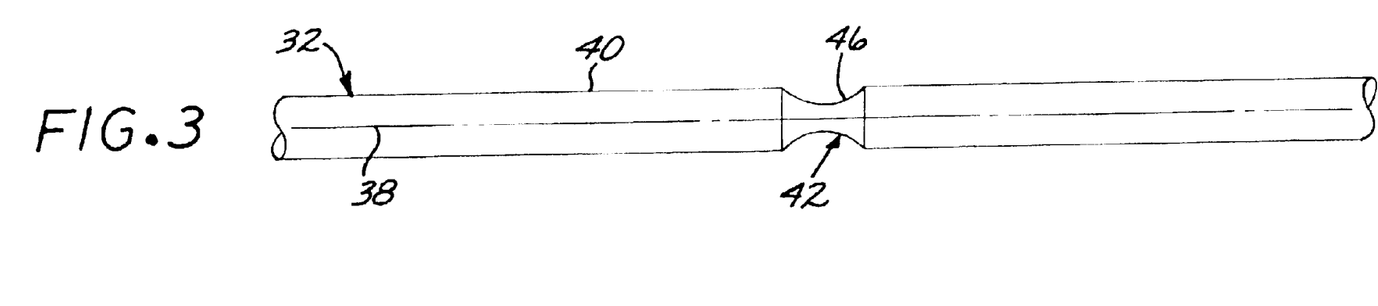
FIG. 3 is an enlarged elevational view of a solid optical conductor having a transverse notch therein.

The depth of the peripheral notch 40 need not be constant. For example, a surface notch 44 may be formed using a triangular file drawn transversely across the solid optical conductor 32 to create generally straight, sharp-bottomed notches whose depth varies with position. However, the gently rounded notch profile shown for another embodiment in FIG. 3 is preferred to the sharp-bottomed notch to avoid mechanical weakening of the solid optical conductor 32 by the introduction of a notch source of cracking. In production, the surface notch may be produced by any operable approach, such as molding, grinding, glass-blowing techniques, or the like, which reproducibly introduces the desirable notch profile. The permitted maximum depth of the surface notch 44 depends upon the acceptance angle, numerical aperture, length, diameter, and thickness of cladding (if any) of the solid optical conductor, and the number of notches in the solid optical conductor 32. In general, the depth of the transverse surface notch 38 must be at least about 1 percent of the through-dimension (typically the diameter) of the solid optical conductor 32. If the surface notch 44 is too shallow, there will be insufficient interference with the total internal reflection of the light path.

Figure 4:
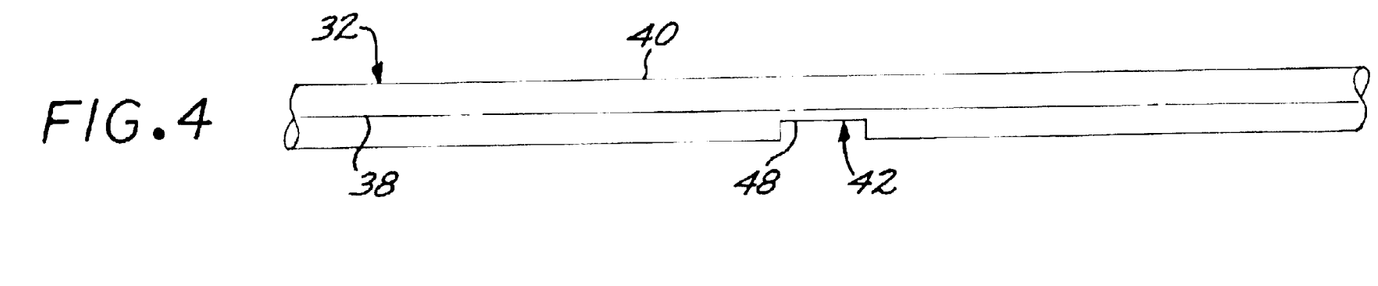
FIG. 4 is an enlarged elevational view of a solid optical conductor having a flat thereon.
Figure 5:
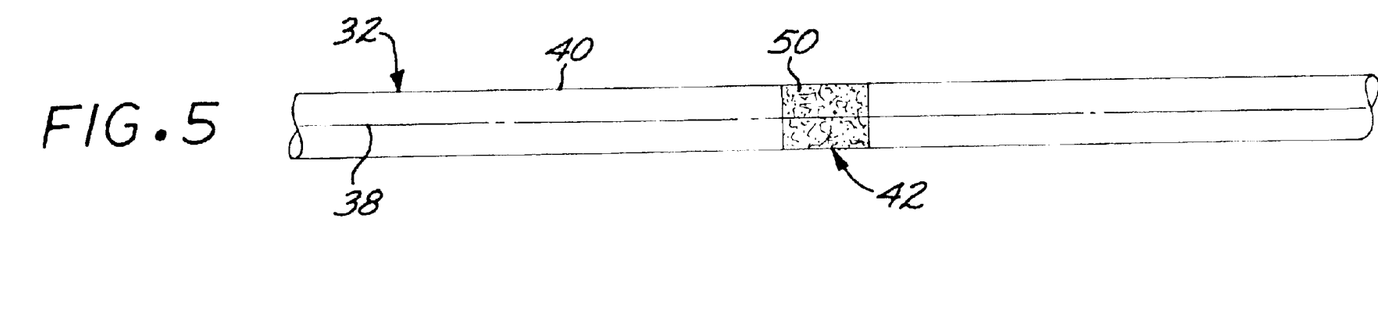
FIG. 5 is an enlarged elevational view of a solid optical conductor having surface roughening thereon.

FIGS. 3–5 illustrate some other operable reflective surface discontinuities 42. The principles discussed above apply equally to these embodiments. In FIG. 3, the reflective surface discontinuity 42 is a peripheral notch 46 that extends completely around the periphery (i.e., circumference for a cylindrical solid optical conductor) of the solid optical conductor 32. The peripheral notch 46 preferably has a gently rounded bottom profile as illustrated, so that it does not induce transverse cracking into, and thereby weaken, the solid optical conductor 32. In FIG. 4, the reflective surface discontinuity 42 is a flat 48 on the solid optical conductor 32. In FIG. 5, the reflective surface discontinuity 42 is surface roughening 50 of sufficient magnitude (that is, of sufficient relief) to interfere with the total internal reflection of light propagating through the solid optical conductor 32 along the axis of elongation 38.

The reflective surface discontinuity 42 in each case is a non internally reflective portion of the outer surface 40 that does not support total internal reflection, except when it is contacted by the liquid 24 to be measured. The outer surface 40 provides total internal reflection for light propagating in the solid optical conductor 32, except in the region of the reflective surface discontinuity 42. In the reflective surface discontinuity 42, the removal of the material produces a non internally reflective surface that does not exhibit total internal reflection along any part of the non internally reflective portion that is not in contact with the liquid. Any portion of the non internally reflective portion contacted by the liquid 24 of lower refractive index than the solid optical conductor 32 does exhibit total internal reflection, so that the propagating light passes unimpeded through that portion. FIG. 1 depicts exactly one reflective surface discontinuity 42 in each of the solid optical conductors 32, but there may be more than one reflective surface discontinuity 42 in each of the solid optical conductors 32. If there is more than one reflective surface discontinuity 42 in any of the solid optical conductors 32, all of the reflective surface discontinuities in that solid optical conductor 32 are positioned by the support 5 at the same height H above the bottom 28 of the volume 22.

Returning to the discussion of FIG. 1, a support 52 positions the reflective surface discontinuity 42 of each of the solid optical conductors 32 at a location corresponding to a different height above the bottom 28 of the volume 22. The schematic drawing of FIG. 1 shows the solid optical conductors 32 passing through the walls of the container 30 with liquid-tight seals 54, but the solid optical conductors 32 may instead pass through the walls at a height well above that to which liquid may be present and the solid optical conductors 32 bent so that the reflective surface discontinuities 42 are at the appropriate levels. In the latter case, no liquid-tight seals are needed. The support 52 may hold the solid optical conductors in any operable orientation, inasmuch as the key consideration is the height at which the reflective surface discontinuities are positioned. In the illustrated embodiment of FIG. 1, the support 52 holds the solid optical conductor 32a at a level such that its reflective surface discontinuity 42 is at a "full" level of the container 30; the solid optical conductor 32b at a level such that its reflective surface discontinuity 42 is at a "¾ full" level of the container 30; the solid optical conductor 32c at a level such that its reflective surface discontinuity 42 is at a "½ full" level of the container 30; the solid optical conductor 32d at a level such that its reflective surface discontinuity 42 is at a "¼ rid full" level of the container 30; the solid optical conductor 32e at a level such that its reflective surface discontinuity 42 is at a "⅛ full" level of the container 30; and the solid optical conductor 32f at a level such that its reflective surface discontinuity 42 is at a "near empty" level of the container 30.

A light source 56 introduces light into the first end 34 of each of the solid optical conductors 32. The light source 56 includes an illumination source 58 which may operate in any wavelength band or at discrete selected wavelengths according to the liquid 24 to be sensed. The liquid 24 to be sensed is transmissive to the wavelength or wavelength band of the light source 56. A preferred illumination source 58 is a light-emitting diode (LED) or a small laser diode operating in the visible range. However, the illumination source 58 may instead operate in the infrared or other ranges. The light source 56 typically also includes a collimating lens 60 that focuses the light output of the illumination source 58 onto the first ends 34 of the solid optical conductors 32. The first ends 34 of the solid optical conductors 32 are typically bundled together as shown in FIG. 2, so that the light output of the illumination source 58 may be readily focused onto the first ends 34. Each of the solid conductors may instead have its own separate illumination source.

A light detector structure 62 receives light that has been introduced into the first end 34 of each of the solid optical conductors 32 and has traveled through the respective solid optical conductor 32 at least as far as at least one of the reflective surface discontinuities 42 of the respective solid optical conductor 32. As with the light source 56, the light detector structure may be well separated from the volume 22 in which the liquid 24 is found, as indicated by the schematic breaks.

In the embodiment of FIG. 1, the light detector structure 62 is a non-electrical structure, in which the light detector structure 62 is not supplied with any electrical power positioned at the second end 36 of the solid optical conductors 32. In this embodiment, the light detector structure 62 comprises a transparent light diffuser in the form of a light-diffuser plate 64 having a textured or ground surface that diffuses the light incident upon it. The second end 36 of each of the solid optical conductors 32 is positioned to direct its output beam upon a first side 66 of the light diffuser plate 64. An opposite second side 68 of the light-diffuser plate 64, shown to the right in FIG. 1, has a visual indication 70 thereon of the liquid level. The visual indication 70 may be of any operable form, such as a color or alphanumeric characters. An indicator color may be supplied by coloring each respective portion of the transparent light diffuser or with an overlay such as a decal.

In operation, light propagating through each of the solid optical conductors 32 by total internal reflection does not pass the respective reflective surface discontinuity 42 if the reflective surface discontinuity 42 is not immersed in the liquid 24. Upon immersion, the light does pass the reflective surface discontinuity 42, reaches the second end 36 of the solid optical conductor 32, and illuminates the respective region 72 of the light diffuser plate 64. In the example shown in FIG. 1 where the height of the liquid surface 26 lies between the vertical positions of the solid optical conductors 32b and 32c, the regions 72 of the light-diffuser plate 64 up to and including the "yellow-½ full" visual indicator 70 would be illuminated, because the liquid 24 contacts the reflective surface discontinuities of the solid optical conductors 32c, 32d, 32e, and 32f. The "yellow-½ full" visual indicator is thus interpreted that the liquid level is between ½ full and ¾ full. For many purposes this level of resolution is sufficient, but the addition of more vertically spaced solid optical conductors 32 can increase the resolution. As illustrated, it is of particular interest in fuel-available situations to know when the liquid level is getting very low, and additional solid optical conductors 32 may be added corresponding to "⅛ full" and "near empty" conditions if desired.

Figure 6:
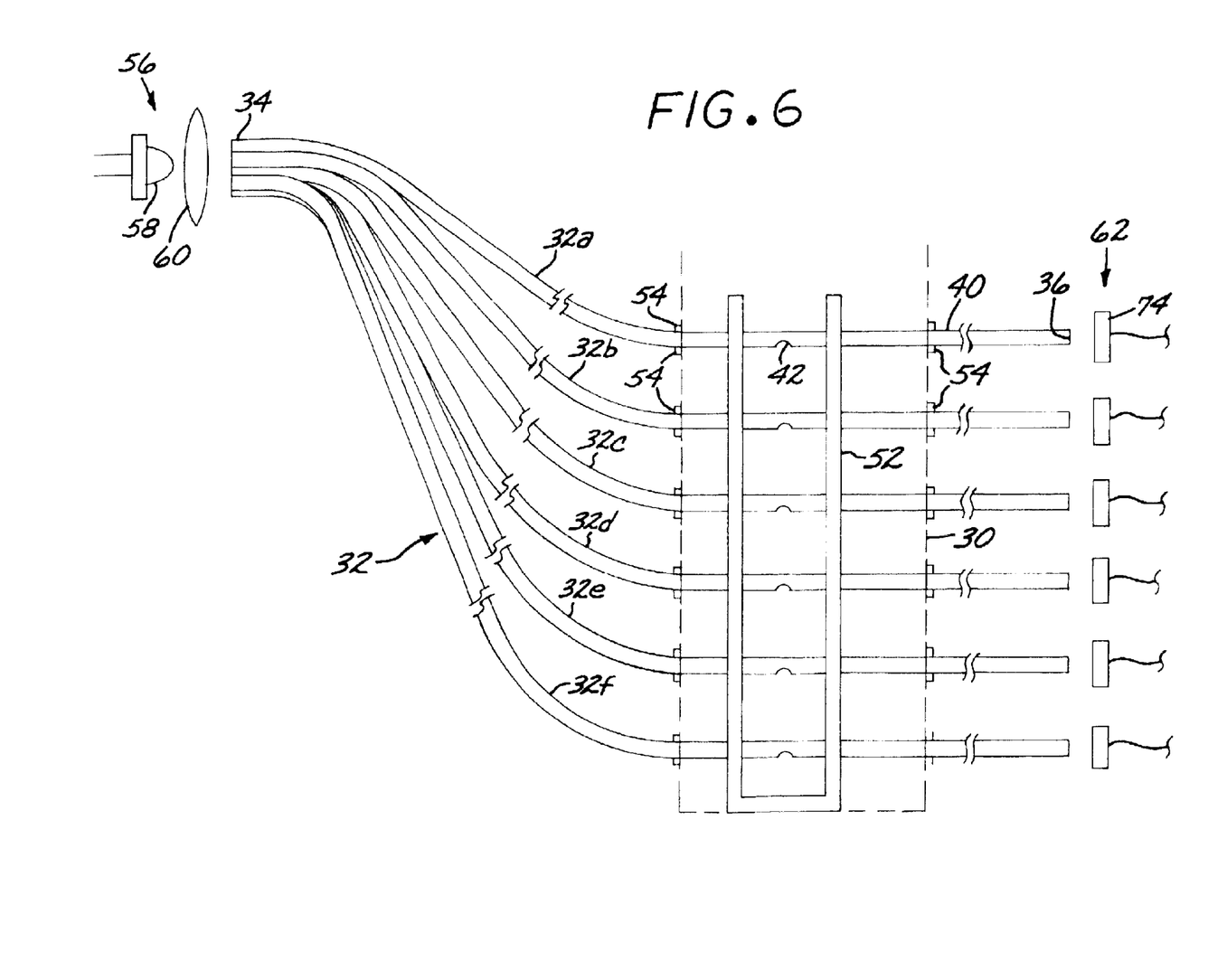
FIG. 6 is a schematic view of a second embodiment of the liquid-level sensor.

FIG. 6 illustrates another embodiment where the light detector structure 62 comprises an electrical device 74, in this case a respective electro-optic detector that senses the light output of each of the respective solid optical conductors 32 and produces a responsive electrical output signal. The embodiments of FIGS. 1 and 6 may be combined in the sense that both a non-electrical visual indicator and also an electrical detector may be provided in the same light detector structure 62. In the embodiment of FIG. 6, the same reference numerals are used to indicate common features discussed above, and the above discussion is incorporated here.

Figure 7:
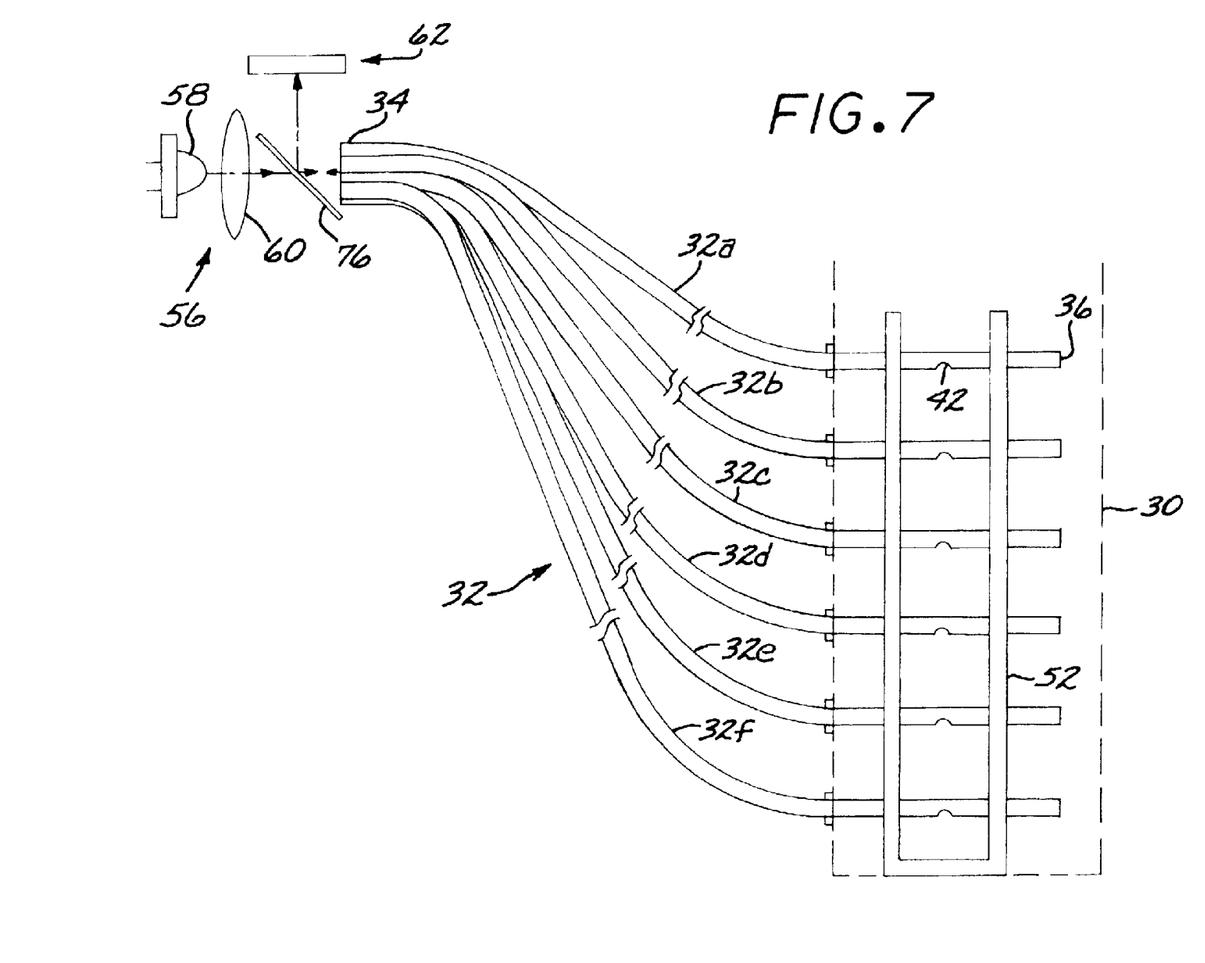
FIG. 7 is a schematic view of a third embodiment of the liquid-level sensor.

FIG. 7 illustrates another embodiment wherein the second end 36 of each of the solid optical conductors 32 is reflective of light, as for example by coating it externally with a reflective coating such as silver metal. The light propagating through the solid optical conductors 32 (and past the reflective surface discontinuities 42) is reflected back to the light detecting structure 62 located at the first end 34 of the solid optical conductors 32. The introduction of the light from the light source 56 into the first end 34 of each solid optical conductor 32 and the simultaneous extraction of the light beam reflected from the second end 36 may be conveniently accomplished with a partially silvered 45-degree mirror 76. (There is such a mirror 76 and light detector structure 62 for each of the solid optical conductors 32, but only one set of the mirrors 76 and light detector structures 62 is shown to avoid clutter in the drawings. A single mirror 76 and spatially resolving light detector structure 62 may instead be used for all of the solid optical conductors 32.) In the embodiment of FIG. 7, the same reference numerals are used to indicate common features discussed above, and the above discussion is incorporated here.

Figure 8:
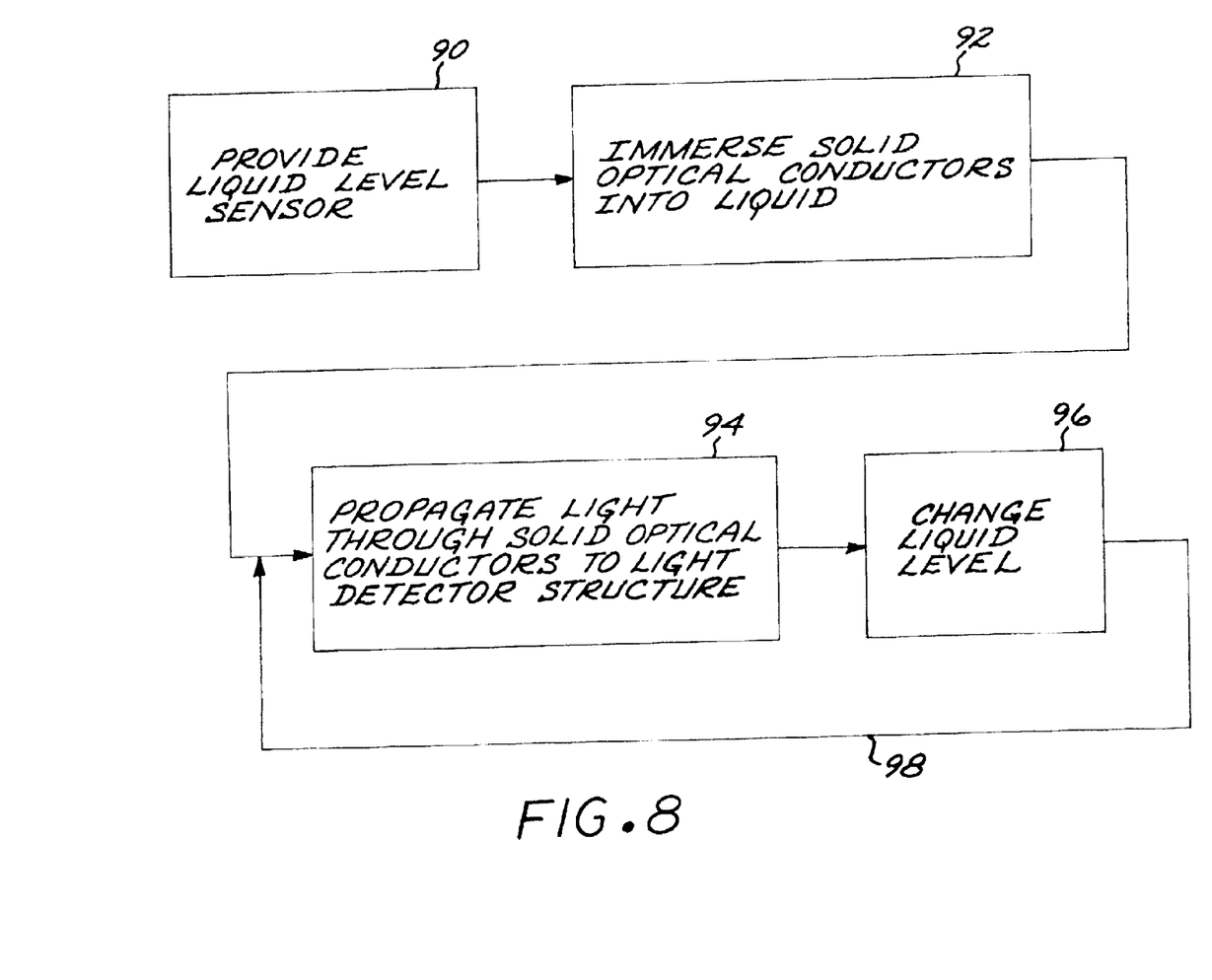
FIG. 8 is a block diagram of a preferred approach for practicing the invention.

FIG. 8 depicts a preferred method for practicing the invention. A liquid-level sensor, preferably the liquid-level sensor 20, is provided, numeral 90. The solid optical conductors 32 are immersed into the liquid 24 to be sensed using the support 52 to hold them at the proper heights H, numeral 92. The liquid 24 to be sensed has a lower index of refraction than the material of the solid optical conductor 32, for the wavelength of light to be used. Light is propagated through the solid optical conductor 28 and its quantity is measured by the respective regions or individual detectors of the light detector structure 62, numeral 94. The light detector structure 62 provides a readout and display of the liquid level, either directly as in the embodiment of FIG. 1, or indirectly as in the embodiment of FIG. 6. Optionally, the liquid level is changed, numeral 96, and step 94 is repeated as indicated by path 98.

The operability of the present approach has been established with a liquid-level sensor 20 having two of the solid optical conductor 32 immersed in a container which could be filled to various heights H. The solid optical conductors 32 were commercial 1.5 millimeter optical fibers, each with a single transverse surface notch 44 about 0.2–0.3 millimeters deep produced with a file. The optical fiber was an Edmund Scientific D2535 fused fiber. The liquid-level sensor 20 was tested on gasoline and on water as the measured liquids using the approach of FIG. 8 and a visual inspection at the second end 36. The approach was operable to indicate the liquid level in the manner described earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A liquid-level sensor operable with a volume in which a liquid may be present to different heights above a bottom of the volume, the sensor comprising;
    at lead two solid optical conductors, each solid optical conductor including an outer surface having at least one reflective surface discontinuity of sufficient size to interfere with a total internal reflection of the solid optical conductor when the reflective surface discontinuity does not contact the liquid;
    a support that positions the reflective surface discontinuity of each of the at least two solid optical conductors at a location corresponding to a different height above the bottom of the volume;
    a light source which introduces light into a first end of each of the solid optical conductors; and
    a light detector structure which receives light that has been introduced into each of the solid optical conductors and has traveled through the respective solid optical conductor at least as far as at least one of the reflective surface discontinuities of the respective solid optical conductor.

2. The sensor of claim 1, wherein the light detector structure comprises a light diffuser having a visual indication of the liquid level.

3. The sensor of claim 1, wherein the light detector structure comprises a non-electrical structure.

4. The sensor of claim 1, wherein the light detector structure comprises an electrical device.

5. The sensor of claim 1, wherein each of the solid optical conductors is an optical fiber.

6. The sensor of claim 1, wherein the liquid is in a container.

7. The sensor of claim 1, wherein the light detector is at a second end of each of the solid optical conductors.

8. The sensor of claim 1, wherein the light detector structure is at the first end of the solid optical conductor, and a second end of the solid optical conductor is reflective of light.

9. The sensor of claim 1, wherein the at least one reflective surface discontinuity comprises a transverse surface notch.

10. The sensor of claim 1, wherein the at least one reflective surface discontinuity comprises a non internally reflective portion of the outer surface of at least one of the solid optical conductors.

11. The sensor of claim 1, wherein the at least one reflective surface discontinuity comprises a non internally reflective flat on the outer surface of at least one of the solid optical conductors.

12. The sensor of claim 1, wherein each of the solid optical conductors is an optical fiber having at least one of the reflective surface discontinuities spaced along a length of each of the optical fibers, and the light detector structure is at a second end of each of the optical fibers.

13. A liquid-level sensor operable with a volume in which a liquid may be preset to different heights above a bottom of the volume, the sensor comprising:
    at least two solid optical conductors, each solid optical conductor including an outer surface having at least one reflective surface discontinuity of sufficient size to interfere with a total internal reflection of the solid optical conductor when the reflective surface discontinuity does not contact the liquid;
    a support that positions the reflective discontinuity of each of the at least two solid optical at a location corresponding to a different height above the bottom of the volume;
    a light source which introduces light into a first end of each of the solid optical conductors; and
    a light detector structure comprising a non-electrical light diffuser positioned so that a second and of each of the solid optical conductors directs a respective output beam onto a respective region of the light diffuser, each of the respective regions having a visual indication thereon of being illuminated by its respective output beam.

14. The sensor of claim 13, wherein each of the solid optical conductors is an optical fiber.

15. The sensor of claim 13, wherein the liquid is in a container.

16. The sensor of claim 13, wherein the at least one reflective surface discontinuity comprises a transverse surface notch.

17. The sensor of claim 13, when the at least one reflective surface discontinuity comprises a non internally reflective portion of the outer surface of at least one of the solid optical conductors.

18. The sensor of claim 13, wherein the at least one reflective surface discontinuity comprises a non internally reflective flat on the outer surface of at least one of the solid optical conductors.

19. The sensor of claim 13, wherein each of the solid optical conductors is an optical fiber having at least one of the reflective surface discontinuities spaced along a length of each of the optical fibers, and the light debtor is at a second end of each of the optical fibers.

20. The sensor of claim 1, wherein the at least one reflective surface discontinuity comprises surface roughening of the outer surface of at least one of the solid optical conductors.

* * * * *